Figure 1:
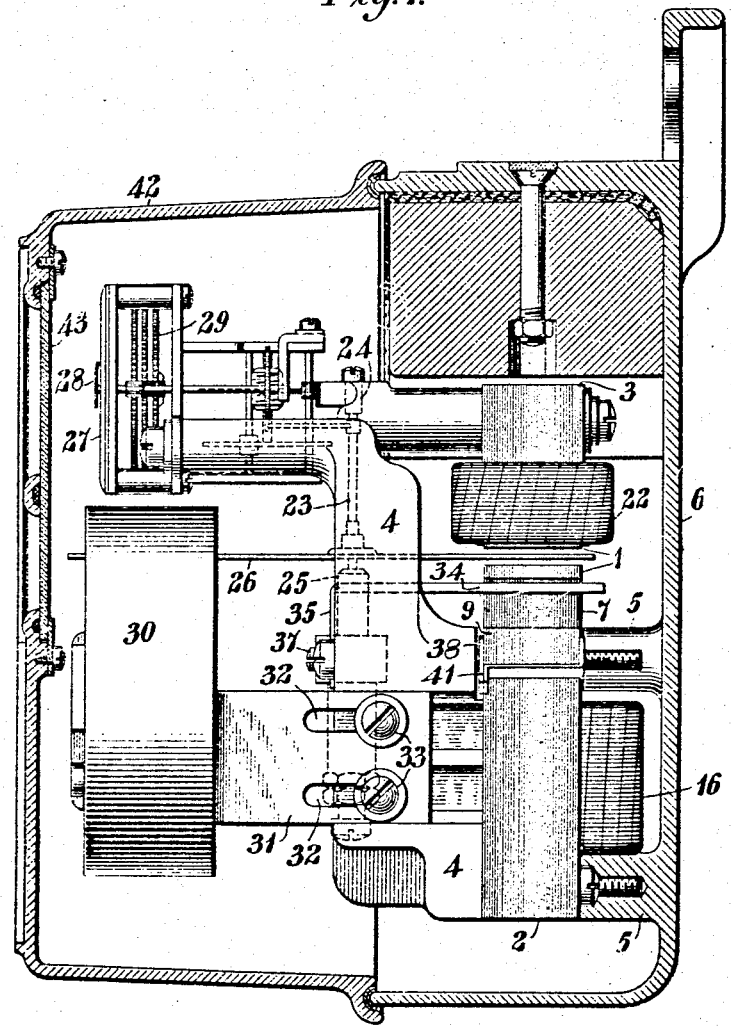

No. 853,218. PATENTED MAY 14, 1907.
W. M. BRADSHAW.
ELECTRIC MOTOR.
APPLICATION FILED FEB. 1, 1905.

2 SHEETS—SHEET 1.

WITNESSES:
C. L. Belcher
Otto S. Schaner

INVENTOR
William M. Bradshaw
BY
Hurley G. Carr
ATTORNEY

No. 853,218. PATENTED MAY 14, 1907.
W. M. BRADSHAW.
ELECTRIC MOTOR.
APPLICATION FILED FEB. 1, 1905.
2 SHEETS—SHEET 2.
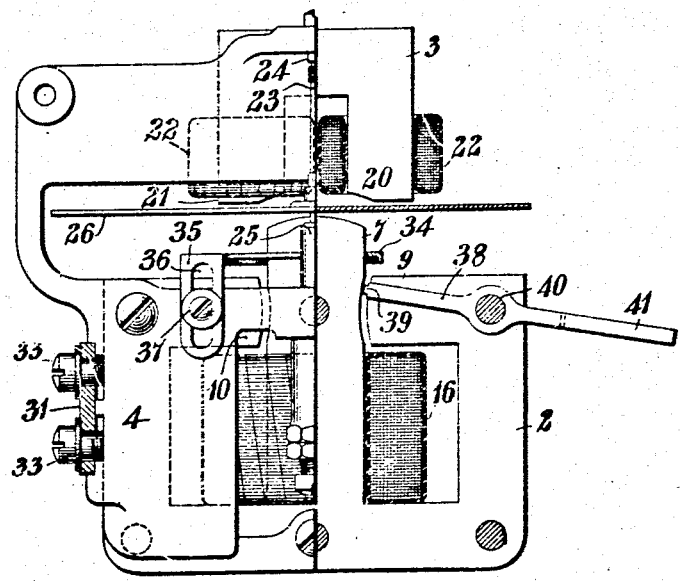
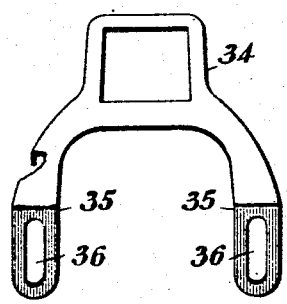
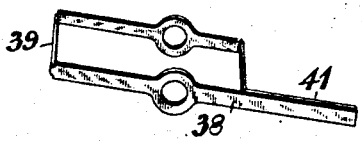
WITNESSES:
C. L. Beecher
Otto J. Schauer
INVENTOR
William M. Bradshaw
BY
Wesley G. Carr
ATTORNEY

UNITED STATES PATENT OFFICE.

WILLIAM M. BRADSHAW, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC MOTOR.

No. 853,218.  Specification of Letters Patent.  Patented May 14, 1907.

Application filed February 1, 1905. Serial No. 243,739.

*To all whom it may concern:*

Be it known that I, WILLIAM M. BRADSHAW, a citizen of the United States, and a resident of Wilkinsburg, in the county of Allegheny and State of Pennsylvania, have invented a new and useful Improvement in Electric Motors, of which the following is a specification.

My invention relates to means for transforming alternating current electrical energy into mechanical energy, and particularly to electrical measuring instruments embodying such means, though susceptible of more general application.

My invention has for its object to provide an instrument of the character indicated which shall be simple and compact in construction and efficient in operation and in which a sufficiently high torque shall be exerted upon the rotatable member to insure substantially accurate measurement of the energy of distributing systems throughout a wide range of variation in the loads upon such systems, when used for measuring such energy.

A further object of my invention is to provide an instrument which shall be accurate in operation on a circuit of any power factor, and which shall insure the required condition of exact quadrature relation between the current and the electromotive force fluxes in the instrument in a simple and efficient manner.

If my invention is utilized in a registering meter, the rate of rotation of the armature may be maintained almost exactly proportional to the amount of energy traversing the circuit by means of a simple, easily adjustable and novel device which compensates for the friction between its relatively movable parts.

My invention is illustrated in the accompanying drawings, Figure 1 of which is a view in side elevation of an instrument constructed in accordance therewith, the inclosing casing being shown in section. Fig. 2 is a view, partially in front elevation and partially in section, of the motor members of the instrument shown in Fig. 1. Figs. 3 and 4 are perspective views of certain of the elements of my instrument, and Fig. 5 is a diagrammatic view of the motor members of my instrument and the proper connections thereof with a distributing circuit.

A magnetizable core 1, comprising two sections 2 and 3, is clamped between a bracket 4 that carries certain of the operating parts of the instrument and lugs 5 that are cast integral with a suitable supporting base 6.

Section 2 of the core 1 is composed of laminæ of sheet iron or other suitable magnetizable material, comprising a main polar projection 7 and two polar projections 9 and 10 between the convex faces 11 and 12 of which and corresponding concave portions 13 of the polar projection 7 are curved air gaps 14 and 15. A winding 16 that comprises a large number of turns of comparatively small wire is placed upon polar projection 7 and its terminals are connected between distributing conductors 17 and 18 that are supplied with alternating current energy from a suitable source 19.

Section 3 of the core 1 is composed of laminæ having polar projections 20 and 21 that are located opposite the air gaps 14 and 15. The polar projections 20 and 21 are provided with windings 22 that are connected in series with the generator 19.

Mounted upon a shaft 23, which is journaled in bearings 24 and 25, is a disk 26 of suitable conducting material which projects into the air gap between the face 8 of the polar projection 7 and the faces of polar projections 20 and 21, the number of rotations made by the disk being registered upon a dial 27 by one or more pointers 28 connected in the usual manner, through a train of gears 29, to the shaft 23.

In order to govern the rotation of the disk 26 and cause its speed to be proportional to the amount of energy traversing the distributing circuit, one or more permanent magnets 30, of such form as to most satisfactorily perform the desired function and at the same time permit of a simple and compact construction, may be employed. Such magnets may be adjustably supported by a bracket 31, having slots 32 in the free ends thereof, set-screws 33 being provided for attaching the bracket 31 to the bracket 4.

The form of the section 2 of the core 1 and the electrical dimensions of the winding 16 are such that the circuit containing the winding 16 is highly self-inductive and consequently the current in that circuit lags nearly 90° behind the impressed electromotive force, while the circuit containing the winding 22 is only slightly self-inductive and consequently the current in that circuit lags but little behind the impressed electromotive force.

In order that the instrument may register accurately the amount of energy traversing the distributing circuit, the two magnetic fields of the instrument must be in quadrature relation to each other when the power factor of the distributing circuit is unity. Means for effecting this exact quadrature relation comprises a loop 34 that surrounds the free end of polar projection 7 and is so supported as to be adjustable longitudinally with reference thereto, by means of arms 35 having slots 36 at their free ends and set-screws 37 that are threaded in the bracket 4.

In order that friction between the relatively movable parts of instruments of this character may not prevent accurate registration of the amount of energy supplied through the instrument during a specific interval of time, means for overcoming such friction are provided which comprise a closed circuit conductor 38 having one side 39 located in the air gap 14 between pole face 11 and concave portion 13 of polar projection 7. The conductor 38 is pivotally supported at a point 40 that is the center of a circle of which the sides of the gap 14 are arcs and its free end 41 is extended in order that it may occupy an easily accessible position and thereby provide simple means for effecting adjustment of the side 39 in the air gap 14. Since the conductor 38 surrounds a part of the shunt flux that crosses the air gap 14, that side of the shunt magnet circuit will have a different field strength or a different degree of magnetization from the other side and by adjusting the position of the conductor 38 so that it surrounds more or less of this flux, the difference in the degrees of magnetization of the two sides of the magnetic circuit may be so adjusted that the speed of rotation of the disk will be increased just sufficiently to compensate for the retardation due to friction.

A cover 42 is provided for the purpose of inclosing all of the above mentioned parts of the instrument, a glass plate 43 being provided in the cover directly in front of the dial 27 on which is registered the number of rotations of the disk.

While I have shown and described my invention as adapted for registering the amount of energy which traverses a circuit during a specific interval of time, it is evident that, without materially altering the essential details of the meter, it may be modified so as to indicate the amount of energy which is traversing the circuit at any instant, or to record the energy values at all times. Other details may also be varied within considerable limits and I do not wish my invention limited, except by such restrictions as may be imposed by the prior art.

I claim as my invention:

1. In an alternating current motor, a magnetizable core comprising two alined polar projections having opposing faces, and a main polar projection which differs in polarity therefrom and extends between and materially beyond said opposing faces, from which it is separated by air gaps of uniform width, and a second magnetizable core having its polar faces respectively opposite the air gaps in the first magnetizable core.

2. In an alternating current motor, a magnetizable core in two parts, the first comprising a pair of alined polar projections having opposing faces and a main polar projection that differs in polarity therefrom and extends between and materially beyond said opposing faces to form air gaps of uniform width, the second part having polar projections symmetrically placed with reference to the main polar projections and the faces of which lie opposite the face of the main projection.

3. In an alternating current motor, a magnetizable core comprising a main polar projection and projections differing in polarity therefrom between the faces of which and the sides of the main projection there are air gaps, a second magnetizable core having its polar faces respectively opposite and symmetrically placed with reference to the face of the main polar projection of the first core, and a closed-circuit conductor adjustable in position longitudinally on the main polar projection.

4. In an alternating current motor, the combination with shunt and series windings, of a magnetizable core comprising a main polar projection for the shunt winding, projections at right-angles thereto that differ in polarity therefrom and between the end faces of which and the sides of the main polar projection there are curved air gaps, a friction-compensating device so pivoted to said core that one of its sides is adjustably located in one of said curved air gaps, and a second magnetizable core having polar projections for the series winding symmetrically placed with reference to the main polar projections and the faces of which lie opposite the face of the main projection.

5. In an alternating current motor, the combination with shunt and series windings, of a magnetizable core comprising a main polar projection for the shunt winding, projections differing in polarity therefrom between the faces of which and the sides of the main polar projection there are air gaps, a second magnetizable core having polar projections for the series winding symmetrically placed with reference to the main polar projection and the faces of which lie opposite the face of the main projection, and a closed-circuit conductor adjustable longitudinally on the main polar projection.

6. In an alternating current motor, the combination with shunt and series windings and a rotatable disk, of a magnetizable core comprising two alined polar projections having opposing faces, a main polar projection that extends between and materially beyond the said opposing faces, from which it is separated by air gaps of uniform width, and another magnetizable core having polar projections for the series winding, the faces of which lie adjacent to the disk in symmetrical positions with reference to the face of the main polar projection and on the opposite side of the disk.

7. An alternating current motor having shunt and series field coils, and separate cores for said coils, one of which has two alined polar projections the end faces of which are in opposition, and a third polar projection that extends between and materially beyond the opposed projections, from which it is separated by air gaps, and the other of which has two polar projections that are opposite the gaps in the first named core.

In testimony whereof, I have hereunto subscribed my name this 27th day of January, 1905.

WILLIAM M. BRADSHAW.

Witnesses:
 JOE PAULSON,
 BIRNEY HINES.